(12) United States Patent
Ojeda et al.

(10) Patent No.: US 8,410,911 B2
(45) Date of Patent: Apr. 2, 2013

(54) RFID NETWORK SYSTEM

(75) Inventors: Antonio Vidaurri Ojeda, Monterrey (MX); Rafael Guillermo Ramos Elizondo, Monterrey (MX)

(73) Assignee: RFID Mexico, S.A. DE C.V., San Pedro Garza Garcia, N.L. (MX)

( * ) Notice: Subject to any disclaimer, the term of this patent is extended or adjusted under 35 U.S.C. 154(b) by 946 days.

(21) Appl. No.: 12/249,192

(22) Filed: Oct. 10, 2008

(65) Prior Publication Data

US 2009/0261956 A1  Oct. 22, 2009

Related U.S. Application Data

(63) Continuation-in-part of application No. 12/103,741, filed on Apr. 16, 2008, now abandoned.

(51) Int. Cl.
*H04Q 5/22* (2006.01)
*G06F 17/00* (2006.01)
*G06F 7/00* (2006.01)

(52) U.S. Cl. .............. 340/10.51; 340/10.13; 340/10.3; 340/10.4; 235/375; 235/376

(58) Field of Classification Search ........ 340/10.1–10.6, 340/572.1–572.9; 235/375–385
See application file for complete search history.

(56) References Cited

U.S. PATENT DOCUMENTS

| | | | | |
|---|---|---|---|---|
| 6,138,058 | A * | 10/2000 | Van Antwerp et al. | 700/225 |
| 6,988,154 | B2 * | 1/2006 | Latta | 710/240 |
| 7,567,179 | B2 * | 7/2009 | Stephensen et al. | 340/572.1 |
| 2005/0114326 | A1 * | 5/2005 | Smith et al. | 707/3 |
| 2008/0184355 | A1 * | 7/2008 | Walrath et al. | 726/9 |
| 2008/0186179 | A1 * | 8/2008 | Huang | 340/572.1 |
| 2008/0186180 | A1 * | 8/2008 | Butler et al. | 340/572.1 |
| 2008/0197975 | A1 * | 8/2008 | Ryoo et al. | 340/10.1 |
| 2008/0231450 | A1 * | 9/2008 | Posementier | 340/572.1 |
| 2008/0252459 | A1 * | 10/2008 | Butler et al. | 340/572.1 |
| 2010/0148925 | A1 * | 6/2010 | Kaplan | 340/10.1 |

* cited by examiner

*Primary Examiner* — George Bugg
*Assistant Examiner* — Renee Dorsey
(74) *Attorney, Agent, or Firm* — Young & Thompson

(57) ABSTRACT

A RFID network system which allows the use of simple and low cost, reduced functionality RFID readers/writers thanks to the use of a plurality of concentrators which allow to distribute the processing work related to the reading, writing and verification of each reader, thus optimizing the use of each system component and achieving high processing velocities.

4 Claims, 3 Drawing Sheets

RFID NETWORK SYSTEM

BACKGROUND OF THE INVENTION

A. Field of the Invention

The present invention is related to systems and methods for obtaining information from RFID tags by means RFID readers/writers and more particularly to a communication network for connecting a plurality of RFID readers/writers with a computer at a minimum cost using simplified and low cost RFID readers/writers controlled by one or more concentrators.

B. Description of the Related Art

RFID (radio frequency identification) is a technology that incorporates the use of electromagnetic or electrostatic coupling in the radio frequency (RF) portion of the electromagnetic spectrum to uniquely identify an object, animal, or person. RFID is coming into increasing use in industry as an alternative to the bar code. The advantage of RFID is that it does not require direct contact or line-of-sight scanning. An RFID system consists of three components: an antenna, a transceiver (often combined into one reader) and a transponder (the tag). The antenna uses radio frequency waves to transmit a signal that activates the transponder. When activated, the tag transmits data back to the antenna. The data is used to notify a programmable logic controller that an action should occur. The action could be as simple as raising an access gate or as complicated as interfacing with a database to carry out a monetary transaction.

Information systems using RFID technology for identifying items, require a plurality of RFID Readers/writers in order to read the information that is stored in RFID tags which are attached to a particular material which is mostly a plastic card.

RFID readers/writers work on particular principle and they have some devices along with them in order to read the information stored in the RFID transponder. Transponder is basically the device which stores the information and sends it to the reader via radio waves which is then captured by the reader. It is to be noted that the communication which takes place between the transponder and the RFID reader doesn't require a wire connection.

Precisely, RFID reader/writer comprises a module, a control unit and a coupling element. The module is comprised by the transmitter and the receiver and the coupling unit comprises the antenna. The reader has to perform three functions in order to read the information, namely energizing, demodulating and decoding. Though this process the reader can read the information stored in the RFID.

Although the RFID readers/writers can differ quite considerably in complexity, depending upon the type of tags being supported, generally, the cost, complexity and manageability of the RFID readers/writers have been obstacles to widespread adoption of the technology.

In some applications of RFID technology, it is necessary the implementation of a great number of RFID readers/writers, especially those that require having an RFID reader for reading a specific tag, such as the Item Tracking System disclosed in U.S. patent Ser. No. 11/856,869.

Said patent application, discloses an item tracking system which makes use of a plurality of RFID readers/writers for automatically monitoring the taking and returning operations of items from one or more storage locations inside a working area. Said system employs a RFID reader per item and there can be dozens of items inside a storage location.

A typical RFID reader has an intelligent controller that handles high level protocols (auto report, detection report, programmable options for information formatting and high level electrical interfaces like Ethernet or rs-232).

Since the above referred system uses a great number of RFID readers/writers, it is necessary to install the lowest cost RFID readers/writers available in order to lower the overall price of the system.

In view of the necessity to count with a very low cost RFID reader/writer, applicant developed a low cost RFID readers and a related network for interconnecting said RFID readers/writers by means of one or more intelligent concentrators— for controlling the reading, writing and verification tasks normally addressed by common RFID readers/writers—to a computer or control system. The computer control system communicates with the plurality of RFID reader by means of a low level protocol which requires very few processing power. The commands of said protocol are processed by each concentrator which in turn controls a network of readers/writers. Since applicant's network system can include several concentrators, any protocol command sent by the computer control system can be processed by two or more concentrators at the same time, thus giving the network system of the present invention the capacity to process a single instruction in parallel, raising the reading/writing processing capacity. Furthermore, specific commands can be sent to specific readers/writers or to all of the readers/writers controlled by a concentrator.

U.S. patent application No. 20070156450 discloses "a system and method of remotely monitoring patient health care characteristics. The system utilizes at least two micro-scale to millimeter-scale sensors, a wireless network, a central hub and pre-processing center and a means for notifying a clinician of the remote patient's condition. The system and method includes sensor to sensor coordination, modular-based sensors and processing, and allows a clinician to remotely configure the system". Although said system and method discloses the use of a central hub and pre-processing center for controlling said plurality of sensors, it doesn't discloses that the sensors may comprise RFID readers/writers nor that the central hub and pre-processing centers have means for controlling the functions of the RFID tags. Furthermore, it is disclosed that "each of the plurality of sensors is configured to continuously communicate with each other and with the central hub; wherein each of the plurality of sensors is autonomous, thereby capable of automatic configuration with the modular sensing system", which raises the complexity and cost of the network.

U.S. patent application No. 20070096874 of Mravaca, discloses a system and method are provided for interrogating passive radio frequency identification (RFID) transponders located in compartmentalized areas such as on shelves or in other spatially-partitioned storage areas. The system includes a controller and a plurality of minimal function RFID readers coupled to the controller via a network-compatible cable. The controller is configured to address a subset of at least one reader at a time to interrogate the RFID transponders located in at least one of the compartmentalized areas. The readers are each give a physical location and a unique address, through which the controller would know the locations of the RFID transponders being interrogated. The functions disclosed in Mravaca patent application are specifically designed to be used in inventory control systems which require high level functions which require a lot of processing power. Furthermore, Mravaca patent application does not disclose nor suggest the use of a low level protocol for allowing the communication between a central computer with a plurality or writers readers nor the possibility that a protocol command could be directed to a specific reader/writer or to all of the readers/writers of a network. Also, it does not disclose nor suggest that several tasks could be processed at the same time in the way applicant's network system does using two or more concentrators. Furthermore, the minimal function RFID readers disclosed in Mravaca patent application communicate by means of ETHERNET which is not a simple protocol and requires a lot of processing power and software.

The RFID readers/writers used by applicant's system consists of only the essential processing that is required to write a tag, identify a tag and get the information in it. They communicates with a low level protocol which requires low processing power thus reducing the component count and allowing the use of more limited controllers and the use of fast, low cost and high range networks. This helps in reduce cost and size.

Thanks to the use of one or more intelligent concentrators in applicant's network design, it is possible to use simple and low cost RFID readers/writers, since there is no necessity to include in each reader, electronic means for controlling the reading, writing and verification tasks and helps to modularize the network by helping to separate the software development for the control of the concentrators and RFID readers/writers and for the C.P.U.

Furthermore, since the processing work is distributed among several intelligent concentrators related to the reading, writing and verification of each reader, it is optimized the use of each system component.

Finally, applicant's network achieves high processing velocities since it allows to quickly performing RFID reading, writing and verification operations with several RFID readers/writers at the same time.

SUMMARY OF THE INVENTION

It is therefore a main object of the present invention to provide a RFID network system which thanks to its design allows the use of simple and low cost RFID readers/writers since there is no necessity to include in each reader, electronic means for controlling the reading, writing and verification tasks.

It is an additional main object of the present invention to provide a RFID network system of the above referred nature in which the processing work related to the reading, writing and verification of each reader, is distributed among several intelligent concentrators thus optimizing the use of each system component.

It is an additional object of the present invention to provide a RFID network system of the above referred nature which achieves high processing velocities since it allows to quickly perform RFID reading, writing and verification operations using several RFID readers/writers at the same time.

It is a further object of the present invention to provide a low cost RFID reader/writer having only the essential processing that is required for writing a tag, identifying a tag and getting the information in it which uses a low level interface thus reducing the component count and allowing the use of more limited controllers.

These and other objects and advantages of the RFID network system of the present invention will become apparent to those persons having an ordinary skill in the art, from the following detailed description of the embodiments of the invention which will be made with reference to the accompanying drawings.

DETAILED DESCRIPTION OF THE INVENTION

Figure 1:
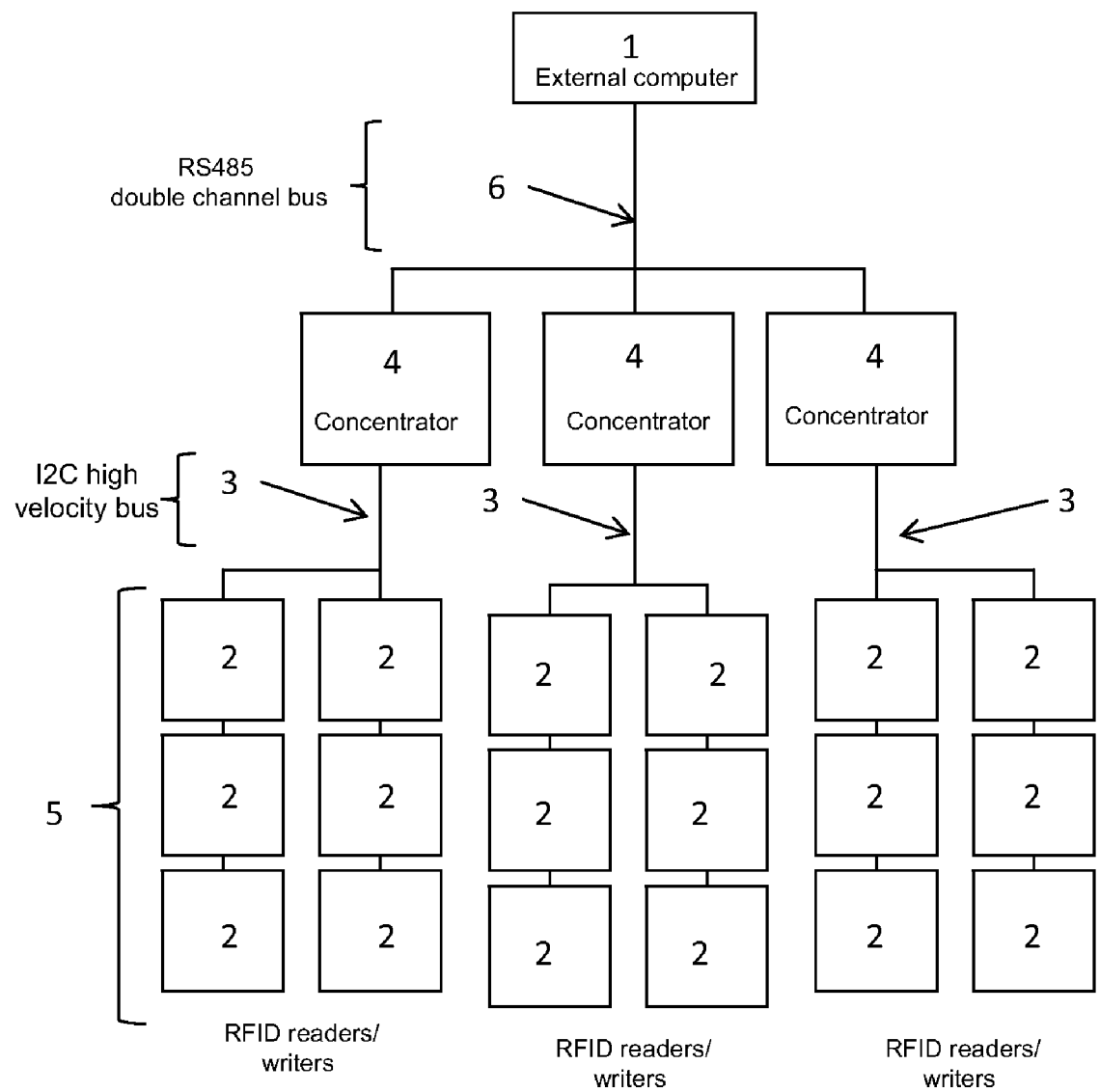
FIG. 1 is a diagram of the RFID network system of the present invention.
Figure 2:
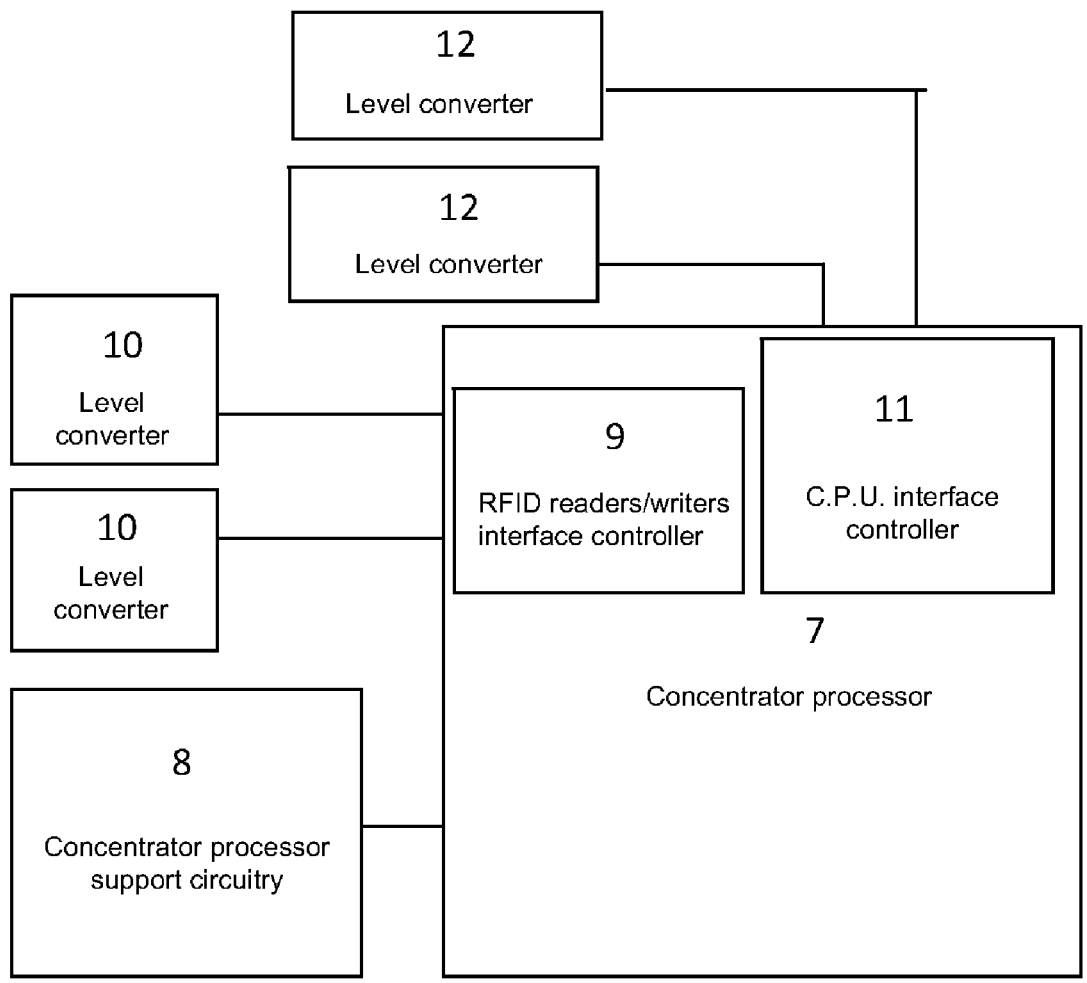
FIG. 2 is a diagram of the internal components of a concentrator of the RFID network system in accordance with the present invention.
Figure 3:
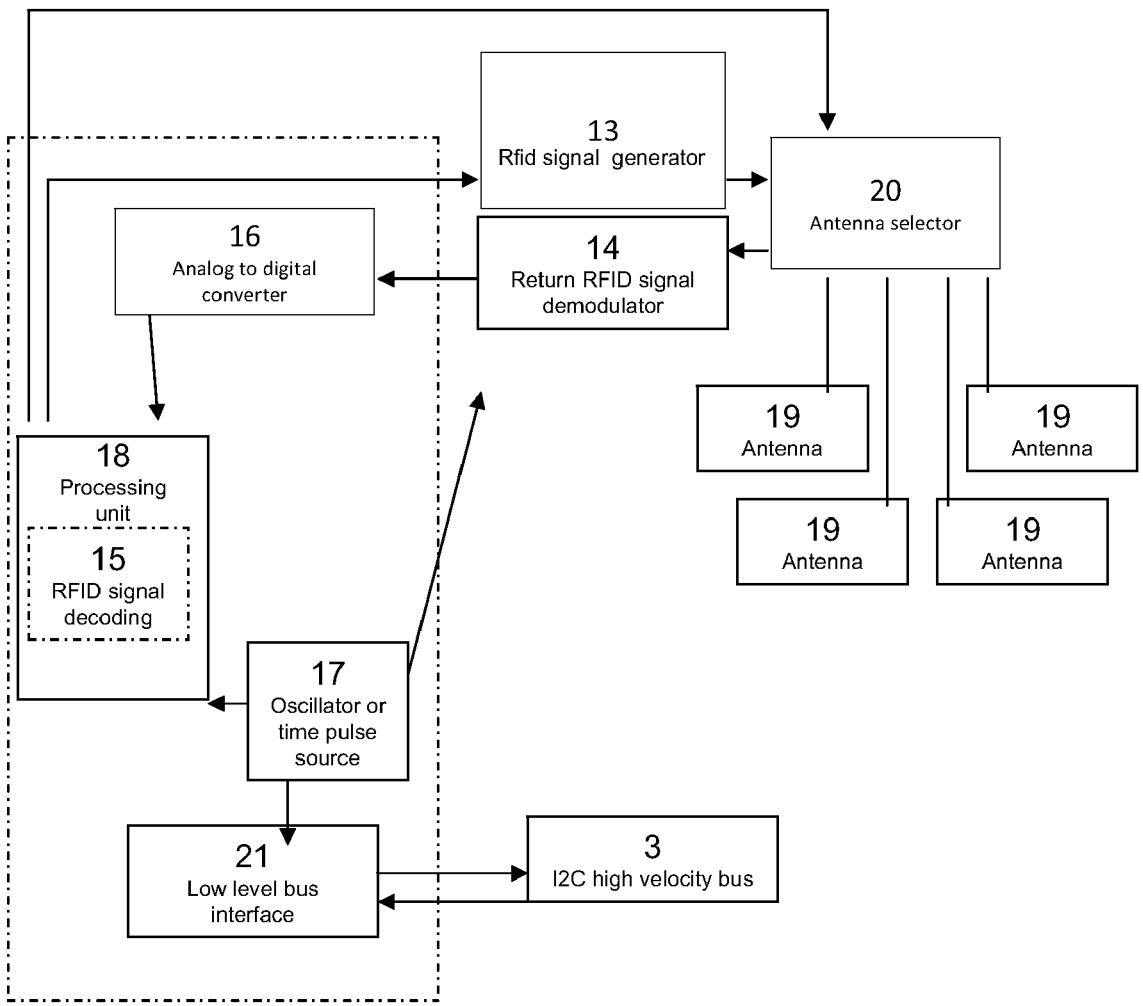
FIG. 3 is a diagram of the internal components of the low cost reduced functionality RFID reader/writer in accordance with the present invention.

The RFID network system of the present invention will be described in accordance with a preferred embodiment thereof and making reference to the accompanying drawings.

In a preferred embodiment, the RFID network system of the present invention is connected to an external computer (C.P.U) 1 for obtaining information from a plurality of RFID readers/writers 2, wherein the RFID network system of the present invention comprises:

a plurality of RFID readers/writers 2, each including only the essential components for identifying a RFID tag (not shown) and getting the information in it, wherein each RFID reader 2 communicates by means of a low level high velocity interface 3 comprising a I2C high velocity bus (or spi-direct microcontroller interfaces-) with a correspondent concentrator 4;

a plurality of concentrators 4, each connected to the C.P.U. 1, for controlling the reading, writing and verification of a set 5 of a plurality of RFID readers/writers 2—each concentrator and its related set of controlled readers/writers 2 is called a hub-, and each one connected to a set 5 of a plurality of RFID readers/writers 2 by means of a low level high velocity bus 3 comprising a I2C high velocity bus (or serial such as 232, 485 or 422) and connected to the C.P.U. 1 by means of a long range "low noise" bus, comprising a RS485 double channel bus 6, each concentrator comprising:

a concentrator processor 7 running a control and automation program for controlling the reading, writing and verification operations of a respective set 5 of a plurality of RFID readers/writers 2—hub-.

concentrator processor support circuitry 8, for supporting the concentrator processor with processes such as power conditioning, etc., comprising:

power conditioning circuits: helps to convert the power in the hub to a correct level to operate the rest of the hub. This circuits also clean the signal to eliminate interference in the hub power lines.

power control circuitry: for cutting the energy to the respective set of RFID readers/writers 2, when there are not in use for saving energy;

microcontroller support circuits;

oscillator circuits and other circuits required for the operation of the microcontroller;

high level communications circuitry: converts the concentrator processor level signals to a system that allows for longer distances and higher interference tolerance.(rs485, rs422, canbus);

a RFID readers/writers interface controller 9 connected to the concentrator processor by means of a level converter 10, for controlling the communication between the concentrator processor and each RFID reader 2 by means of the I2C high velocity bus 3;

a C.P.U. interface controller 11 connected to the concentrator processor, using a level converter 12 for controlling the communication between the concentrator processor and the computer 1 by means of the long range "low noise" bus, comprising a RS485 double channel bus 6;

The RFID readers/writers 2 do not contain high cost components to support high level languages like Ethernet, usb or other networking standards that require special hardware and high level protocol implementation, thus requiring either a dedicated protocol processor or a more powerful main processor to support this additional load. They should implement a network bus like i2c, rs232 or rs485, as this bus standards do not dictate for high level processing and can be done by most microcontrollers without any special hardware or special software programming. In some cases (rs232, i2c) it can be implemented with literally no extra components.

The RFID readers/writers 2 do not have product specific commands implemented, especially if they incur in extra processing, parsing and other uses of cpu time. The goal is to minimize the processing requirements and implement as much of the reader with a single, non custom chip (typically a microcontroller). Specific tasks such as inventory check, specific data parsing and other functionality such as reporting automatically through Ethernet are not implemented in readers/writers 2, since this would add complexity, power usage, processing, hardware requirements and cost.

The RFID readers/writers 2 have simple addressing methods like direct addressing, where a master calls the reader directly by an ID number and expects a direct response. A secondary addressing mode could be a broadcast to all readers/writers 2 on the same bus, this should not generate a response to avoid the need for collision detection, it should be used to initiate reading, waking or sending a sleep signal to the readers.

The components of each RFID readers/writer 2 are:
Electronics to generate an rfid signal 13;
Electronics to demodulate the return RFID signal 14;
RFID signal decoding 15;
Analog to digital converter 16;
Oscillator or time pulse source 17;
Processing unit 18;
One or more antennas 19;
Antenna selector (if more than one antennas are used) 20;
Low level bus interface 21 (usually a voltage converter or limiter in cases like rs232 or rs485, in i2c only 2 resistors are required)

It's important to note that most of these components can be found inside a modern microcontroller (oscillator, processing unit, analog to digital converter, some low level interfaces like i2c, spi and rs232). Some parts can be done via software inside the processing unit and are usually more cost effective (RFID signal decoding)

As previously described the CPU 1 is connected to the plurality of concentrators 4 by means of a long range "low noise" bus, comprising a RS485 double channel bus 6, and the C.P.U. 1 communicates with each concentrator using a high level protocol interface comprised by a few macro-commands which allows the processor to order several tasks (such as carry out the necessary processes to read a great number of RFID readers/writers) to the plurality of concentrators 4 using a minimum set of instructions, thus minimizing the computer work load and allowing the whole system to carry out multiple time depending tasks at the same time which will be very difficult to coordinate by the computer.

Each RFID readers/writer 2 has a unique id number which identifies each RFID readers/writer 2 and allows the external computer and each concentrator 4 to direct macro-commands to a specific reader/writer 2.

Said macro-commands are:
Pass through: this command allows the C.P.U. to communicate directly with a specific RFID reader/writer with minimal formatting and only the necessary validation.

Hub Ping: request the concentrators to send a message back to the C.P.U., this helps to know if all of the concentrators are working and connected.

Hub address set: sets the address for the C.P.U. to reach a concentrator.

Hub Ping Broadcast: all concentrators send a response with a delay calculated to eliminate collisions. This helps the C.P.U. to Identify all concentrators available.

Hub Get all readers/writers: request the concentrators to send ping commands to the RFID readers/writers and gets a list of all readers/writers available for said concentrator. The concentrator sends this list to the C.P.U.

MACRO Reader test: test a set of RFID readers/writers by request of the C.P.U. and send the results back.

MACRO Get TAG Header data: obtains the RFID TAG header data (all the identification data stored in the tag) of a set of readers/writers by request of the C.P.U. by means of the RFID readers/writers, and send the results back. If no RFID tag is found on the range of a reader a NO TAG message is sent in its place.

MACRO Get TAG Id code: obtains the RFID TAG Id code (the id alphanumeric string that identifies the tag) of a set of readers/writers by means of the RFID readers/writers by request of the C.P.U., and send the results back. If no tag is found on the range of a reader a NO TAG message is sent in its place.

MACRO Add event data: adds an event or data packet to the RFID tag memory on a set of readers/writers by means of the RFID readers/writers by request of the C.P.U. If no tag is found on the range of a reader a NO TAG message is sent in its place.

MACRO Write TAG data: Writes general data to the tag memory on a set of readers/writers by means of the RFID reader by request of the C.P.U. If no tag is found on the range of a reader a NO TAG message is sent in its place.

All macro commands have a reader set associated in the command structure. This allows the C.P.U. to access all or only a portion of the RFID readers/writers of a hub at a time in parallel to its normal operations.

Also, the C.P.U. can send the following set of commands to all concentrators in parallel:
set hub address: sets the address for the C.P.U. to reach each concentrator;
ping: sends a message back to the C.P.U.: this helps to know if each concentrator is working and connected;
ping broadcast: all concentrators send a response with a delay calculated to eliminate collisions, this helps the C.P.U. Identify all concentrators available.

Several concentrators 4 can be organized in zones for a better control of the system.

Each concentrator waits for a command from the C.P.U. When a command to access the readers/writers 2 is received by a concentrator, it sends the appropriate commands to the readers/writers one by one. The information is received back from the readers/writers 2 and processed and formatted, then it is sent back to the central controller 1.

The above can be done in parallel by several concentrators 4 and their related plurality of readers/writers 2—hubs-, allowing a higher speed of an operation and lower complexity in the central controller. However, the C.P.U. is programmed to request the information of each concentrator with a delay calculated to eliminate collisions.

As previously described, there is a Pass through command intended directly for accessing one specific RFID reader/writer. This allows the C.P.U. direct communication with a reader 2.

In other embodiments of the present invention, the following characteristics may be included in the RFID network system:

Each of the plurality of RFID reader/writers may be switchably associated to different concentrators.

Different concentrators may be in periodic or continuous communication with one another to provide status and functionality information.

At least one concentrator may be capable of delegating or receiving authority for communication with the RFID reader/writers from at least one other concentrator in the network.

At least one concentrator may be enabled to take over responsibility from another concentrator should a fault be detected in that concentrator.

Different concentrators may be equipped with different functionalities, wherein said functionalities may be accessed and utilized by other concentrators in the network.

Each concentrator may contain a local memory such that a history of status and operating changes can be stored.

The readers/writers and at least one concentrator utilize HP Memory Spot chip technology.

The readers/writers and at least one concentrator comprise a WiFi-based solution such as, but not limited to, UWB, Wi-Max, and Rubee (IEEE 1901.1).

The connection between the RFID readers/writers and the C.P.U. may be wireless.

Furthermore, a method related to the RFID network system of the present invention comprises:

providing one or more sets of low cost, reduced functionality RFID readers/writers having only components for writing to a RFID tag, identifying the RFID tag, and getting the information in the RFID tag;

controlling the reading, writing, and verification of each set of a plurality of low cost, reduced functionality RFID readers/writers by means of a concentrator;

providing a central computer for controlling the plurality of concentrators;

wherein the external computer communicates with each concentrator using a high level protocol interface comprised by a reduced set of macro-commands.

wherein each concentrator is connected to a hub by means of a low level high velocity bus; and wherein the at last one concentrator is connected to the C.P.U. by means by means of a long range low noise bus.

Finally it must be understood that the electronic RFID network system, of the present invention, is not limited exclusively to the embodiments above described and illustrated and that the persons having ordinary skill in the art can, with the teaching provided by the invention, to make modifications to the RFID readers/writers network system of present invention, which will clearly be within of the true inventive concept and of the scope of the invention which is claimed in the following claims.

We claim:

1. A RFID readers/writers network system, comprising:
an external computer;
a plurality of RFID readers/writers, the RFID readers/writers divided into sets of RFID readers/writers so that the external computer is connected to a set of RFID readers/writers comprised of plural RFID readers/writers;
each RFID reader/writer comprising elements having only components for writing to a RFID tag, identifying the RFID tag, and obtaining information from a RFID tag; and
at least one concentrator connected to the computer,
each concentrator for controlling reading, writing, and verification of a related one of the sets of RFID readers/writers,
wherein a hub is comprised of one concentrator and the related one set of RFID readers/writers, wherein each concentrator comprising:
a concentrator processor running a control and automation program for controlling the reading, writing and verification operations of a corresponding set of RFID readers/writers connected to the concentrator, the corresponding set of RFID readers/writers comprising plural RFID readers/writers;
concentrator processor support circuitry, for supporting the concentrator processor with low level processes;
a RFID readers/writers interface controller connected to the concentrator processor, for controlling the communication between the concentrator processor and each RFID reader of the corresponding set of RFID readers; and
an external computer interface controller, for controlling the communication between the concentrator processor and the external computer, and
wherein the RFID readers/writers interface controller is connected to the concentrator processor by means of a level converter.

2. A RFID readers/writers network system, comprising:
an external computer;
a plurality of RFID readers/writers, the RFID readers/writers divided into sets of RFID readers/writers so that the external computer is connected to a set of RFID readers/writers comprised of plural RFID readers/writers;
each RFID reader/writer comprising elements having only components for writing to a RFID tag, identifying the RFID tag, and obtaining information from a RFID tag; and
at least one concentrator connected to the computer,
each concentrator for controlling reading, writing, and verification of a related one of the sets of RFID readers/writers,
wherein a hub is comprised of one concentrator and the related one set of RFID readers/writers,
wherein the external computer communicates with each concentrator using a high level protocol interface comprised by a reduced set of macro-commands, and
wherein the high level protocol interface macro-commands comprise:
Pass through that allows the external computer to communicate directly with a specific RFID reader/writer with minimal formatting and only the necessary validation;
Hub Ping to request the concentrators to send a message back to the external computer, to know if all of the concentrators are working and connected;
Hub address set that sets the address for the external computer to reach a concentrator;
Hub Ping Broadcast so all concentrators send a response with a delay calculated to eliminate collisions for the external computer to Identify all concentrators available;
Hub Get all readers/writers request the concentrators to send ping commands to the RFID readers/writers and gets a list of all readers/writers available for said concentrator. The concentrator sends this list to the external computer;
MACRO Reader test to test a set of RFID readers/writers by request of the external computer and send the results back;

MACRO Get TAG Header data that obtains the RFID tag header data (all the identification data stored in the tag) of a set of readers/writers by request of the external computer by means of the RFID readers/writers, and send the results back where when no RFID tag is found on the range of a reader a NO TAG message is sent in its place;

MACRO Get TAG Id code that obtains the RFID TAG Id code (the id alphanumeric string that identifies the tag) of a set of readers/writers by means of the RFID readers/writers by request of the external computer, and send the results back where when no tag is found on the range of a reader a NO TAG message is sent in its place;

MACRO Add event data that adds an event or data packet to the RFID tag memory on a set of readers/writers by means of the RFID readers/writers by request of the external computer where when no tag is found on the range of a reader a NO TAG message is sent in its place; and MACRO Write TAG data that writes general data to the tag memory on a set of readers/writers by means of the RFID reader by request of the external computer where when no tag is found on the range of a reader a NO TAG message is sent in its place.

3. A RFID network system as claimed in claim 2, wherein all macro commands have a reader set associated in the command structure, for allowing the external computer to access all or only a portion of the readers/writers of a hub at a time in parallel to its normal operations.

4. A RFID network system, comprising:
an external computer;
a plurality of RFID readers/writers, the RFID readers/writers divided into sets of RFID readers/writers so that the external computer is connected to a set of RFID readers/writers comprised of plural RFID readers/writers;
each RFID reader/writer comprising elements having only components for writing to a RFID tag, identifying the RFID tag, and obtaining information from a RFID tag; and
at least one concentrator connected to the computer,
each concentrator for controlling reading, writing, and verification of a related one of the sets of RFID readers/writers,
wherein a hub is comprised of one concentrator and the related one set of RFID readers/writers, and
wherein the external computer can send the following set of commands to all concentrators in parallel: set hub address: sets the address for the external computer to reach each concentrator; ping: sends a message back to the external computer to know if each concentrator is working and connected; ping broadcast: all concentrators send a response with a delay calculated to eliminate collisions, for the external computer Identify all concentrators available.

* * * * *